Feb. 4, 1936.                L. E. DEIBLER                2,029,468
                    MOTOR VEHICLE SERVICE INDICATOR
                         Filed Oct. 30, 1933
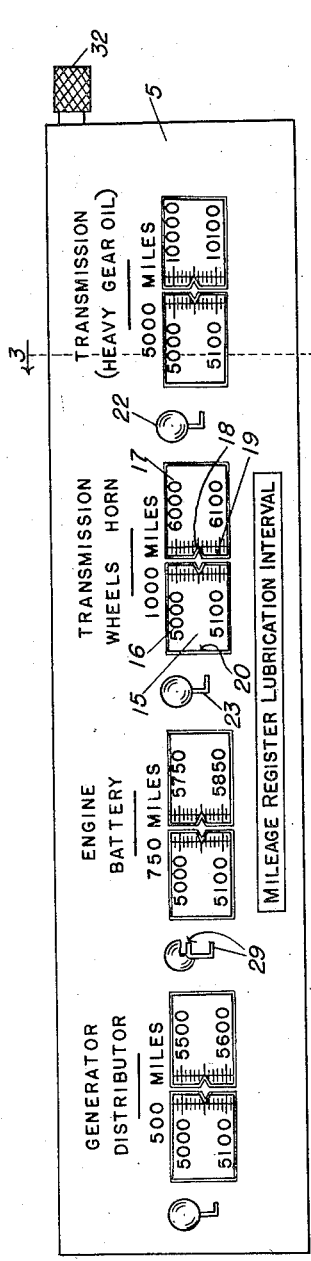 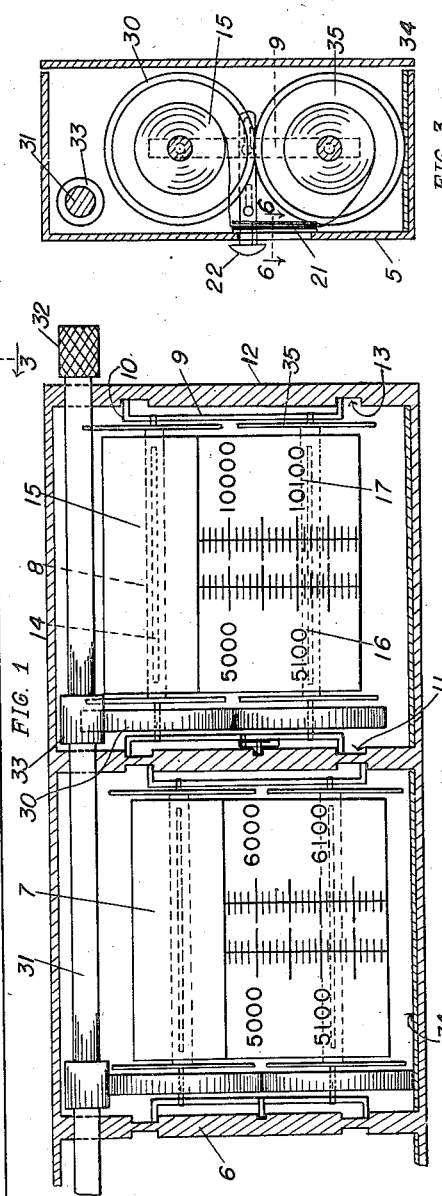 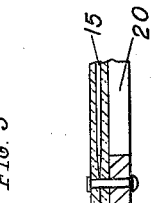 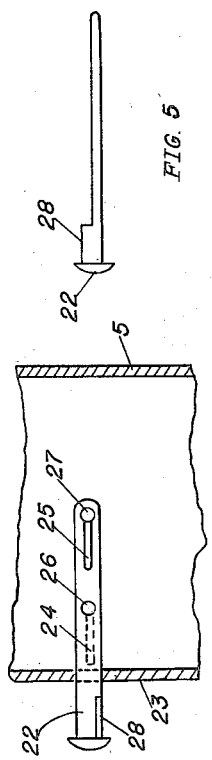 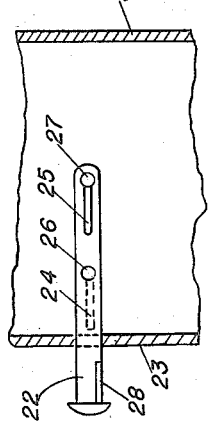
Inventor
L. E. Deibler
By W. E. Beck Jr.
Attorney Patented Feb. 4, 1936

2,029,468

UNITED STATES PATENT OFFICE 2,029,468

MOTOR VEHICLE SERVICE INDICATOR

Lillian E. Deibler, Chevy Chase, Md.

Application October 30, 1933, Serial No. 695,933

5 Claims. (Cl. 40—86)

My invention relates to registers for motor vehicles and more particularly to devices of this character to designate the mileage covered by the vehicle at which servicing of a particular nature last occurred and to designate a predetermined mileage at which such servicing should again occur.

The primary object of the invention is to provide a register embodying a plurality of duplicate indicator mechanisms, each including a double reel and web upon which indicia is carried to indicate the mileage for servicing the vehicle together with a common operating shaft for manually rotating the reels when desired and levers for selectively shifting the reels into or out of operating engagement with the shaft, whereby any one or all of the indicators may be changed in accordance with service conditions of the vehicle.

A further object is to provide a device of this character which may be mounted in a convenient position upon the vehicle, which possesses simplicity and practicability in construction and which is otherwise well adapted for the purposes for which the same is intended.

Other objects and advantages reside in the special details of construction and operation as more fully hereinafter described and explained, reference being had to the accompanying drawing wherein like numerals refer to like parts throughout, and in which Figure 1 is a front elevational view of the device, Figure 2 is a fragmentary vertical, longitudinal, sectional view therethrough, Figure 3 is a transverse sectional view taken substantially on a line 3—3 of Figure 3.

Figure 4 is a detail showing the mounting for one of the operating levers,

Figure 5 is a detail of the lever, and

Figure 6 is a sectional view taken substantially on a line 6—6 of Figure 5, illustrating the frictional guide for the web.

Referring now to the drawing in detail, wherein for the purpose of illustration I have disclosed a preferred embodiment of my invention, the numeral 5 designates a rectangular casing of suitable construction for mounting upon the instrument board or other convenient position of a motor vehicle. The interior of the casing is provided with a plurality of transverse partitions 6 defining individual compartments within each of which is arranged a register or indicator unit designated generally at 7, the units being of duplicate construction and accordingly a description of one will be sufficient for all.

Each indicator unit 7 comprises a pair of reels 8 having their ends journalled in rods 9, the ends of the rods being bent outwardly as at 10 and slidably inserted in recesses 11 formed in the partitions. The end walls 12 of the casing are also provided with similar recesses 13 to accommodate the ends of the rods adjacent thereto.

Each of the reels is provided with a slot 14 for receiving one end of a web 15 for winding about the reel upon rotation thereof and one face of the web has a double row of indicia 16 and 17 printed or otherwise displayed thereon, one row of indicia 16 designating the mileage covered by the vehicle and at which a particular servicing thereof occurred, such as for instance the changing of the engine oil, and the other row of indicia 17 designating the future mileage at which such servicing should again occur. The rows of indicia 16 and 17 preferably should be of a contrasting color, such as black and red, in order that the two rows of indicia may be readily distinguished and prevent confusion. Furthermore the mileage reading at which the last servicing occurred and the mileage reading at which the future servicing should be made, are arranged to appear opposite each other in their respective rows of indicia on the web and has a double ended pointer 18 associated therewith for simultaneously designating the two mileage readings. The pointer 18 is formed on the opposite side edges of a vertical strip 19 which separates a pair of window openings 20, said openings being positioned in the front wall of the casing to permit the reading of the indicia on the web.

The web is fed through a guide 21 secured to the inner wall of the casing to bring the exposed portion flat against the opening, said guide preferably being formed of a pair of closely spaced sheets of mica or other transparent material, the web being in frictional contact between the sheets of mica to secure the same against movement during bodily shifting of the reels for a purpose to be presently explained.

A series of levers 22 project outwardly from the front wall of the casing through vertical slots 23, one of the levers being positioned adjacent each indicator unit. Each lever is provided with a front slotted opening 24 and a rear slotted opening 25, the front opening receiving a pin 26 for pivotally mounting the lever to the adjacent partition 6 and the rear opening receiving a pin 27 carried by one of the rods 9 whereby to raise or lower each indicator unit bodily.

A lateral projection 28 is formed on each lever adjacent its outer end for engaging upper and lower slots 29 extending laterally from the slot 23 to retain the lever in either its raised or lowered position.

The shaft of each reel has a friction wheel 30 keyed or otherwise secured thereto, the wheels of each indicator unit being in constant engagement to wind one of the reels as its companion is unwound.

A shaft 31 extends through the casing having one end projecting outwardly thereof and provided with an operating knob 32. A plurality of friction collars 33 are also mounted on the shaft in position for engagement by the uppermost friction wheel 30 of the respective indicator units.

The bottom of the casing is covered with a thin sheet of friction material 34 upon which the lowermost wheels 30 rest when the upper wheels are out of operative engagement with the shaft in order to prevent idle rotation of the reels.

The reels are preferably provided with guide wheels 35 to prevent longitudinal shifting of the webs during rotation about the reels.

It will be apparent from the foregoing that normally the indicator units will remain idle until the mileage on the speedometer of the vehicle reaches a total corresponding to the service indicating mileage of one of the indicator units whereupon the driver will then notice that the particular part of the car designated should again be serviced. After such servicing he will pull the lever 22 outwardly and swing the same downwardly thus bringing the friction wheel 30 into engagement with its associated collar 33 whereby upon rotation of the shaft 31 the web may be moved to register the present mileage at which the servicing occurred and the future mileage at which such servicing should again be given.

While I have disclosed a preferred embodiment of my invention it will be obvious that minor changes in construction and operation may be made without departing from the spirit of the invention or the scope of the appended claims.

Having thus described my invention, what I claim is:

1. An indicator of the class described comprising a casing having a plurality of window openings, a reel support mounted for reciprocating movement within the casing adjacent each of the openings, a pair of reels rotatably carried by each support, a web for each pair of reels movable across the respective openings upon rotation of the reels, a drive element for the reels and a pivoted lever for each support for selectively moving the supports to operatively engage or disengage the reels with respect to the drive element and a sliding connection for the lever for locking the same in operative or inoperative position.

2. An indicator of the class described comprising a casing having a plurality of window openings, a reel support mounted for reciprocating movement within the casing adjacent each of the openings, a pair of reels rotatably carried by each support, a web for each pair of reels movable across the respective openings upon rotation of the reels, a drive element for the reels, a pivoted lever for each support for selectively moving the supports to operatively engage or disengage the reels with respect to the drive element, and a sliding connection for the lever for locking the same in operative or inoperative position and guide means for the webs for securing the same against movement during movement of said supports.

3. An indicator of the class described comprising a casing having a plurality of window openings, a movable reel support arranged within the casing adjacent each of the openings, a pair of reels rotatably carried by each support, a web for each pair of reels movable across the respective openings upon rotation of the reels, a drive shaft for the reels, a pivoted operating handle for each of the supports for moving the reels into and out of engagement with the shaft, said handle having a slidable connection with the support and cooperating means between the handle and casing for securing the handle in either position.

4. An indicator of the class described comprising a casing having a plurality of window openings, a plurality of reels arranged in pairs within the casing, a slidable support for each pair of reels, a web carried by each pair of reels and provided with indicia thereon for movement across the respective openings, a drive element for the reels, a pivoted slidable lever for each support for selectively moving the reels into and out of operative engagement with said drive element upon its pivotal movement and cooperating means between the casing and lever for securing the lever in either position upon its sliding movement.

5. An indicator of the class described comprising a casing, a double reel and web mounted therein, a support therefor, a drive element, and means for moving the support for engaging and disengaging one of the reels with the drive element, said means comprising a pivoted handle attached to the support and movable independently thereof for locking the reel in either position.

LILLIAN E. DEIBLER.